US000001321H

United States Statutory Invention Registration [19]

[11] Reg. Number: H1321

Atkinson, III et al.

[43] Published: Jun. 7, 1994

[54] RIFLESCOPE UTILIZING GRADIENT INDEX LENSES

[75] Inventors: Leland G. Atkinson, III, Rochester; Duncan T. Moore, Fairport, both of N.Y.; George Nadorff, Walzenhausen, Switzerland

[73] Assignee: The United States of America as represented by the Secretary of the Army, Washington, D.C.

[21] Appl. No.: 983,953

[22] Filed: Dec. 1, 1992

Related U.S. Application Data

[63] Continuation of Ser. No. 915,570, Jul. 20, 1992, abandoned.

[51] Int. Cl.[5] ..... G02B 27/02

[52] U.S. Cl. ..... 359/434; 359/653

[58] Field of Search ..... 359/399, 423, 424, 434, 359/435, 652–653, 646

[56] References Cited

U.S. PATENT DOCUMENTS 3,612,646 10/1971 Walker et al. ..... 359/646

4,859,040 8/1989 Kitagishi et al. ..... 359/652

*Primary Examiner*—Harold J. Tudor

*Attorney, Agent, or Firm*—Anthony T. Lane; Edward Goldberg; Michael Sachs

[57] ABSTRACT

Riflescope arrangement includes a tube containing an eye piece section followed by a relay section which is followed by an objective section. The eye piece, relay and objective sections lie along and are aligned with the optical axis of the riflescope. The front optical element of the objective section is in the form of an axial gradient index element to add a degree of freedom for chromatic and other corrections, without adding an extra element or weight to the riflescope.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

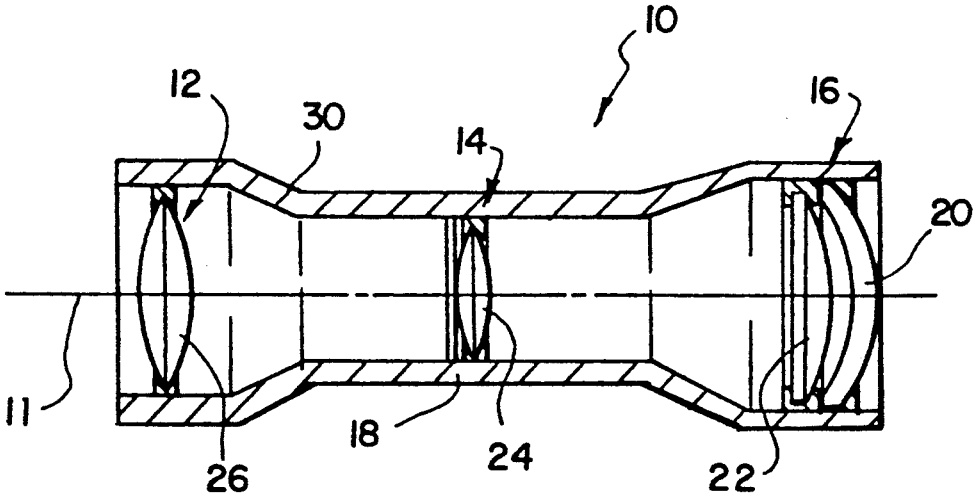
10
12
30
14
16
20
11
26
18
24
22

RIFLESCOPE UTILIZING GRADIENT INDEX LENSES

The invention described herein may be made, used or licensed by or for the Government for Government purposes without the payment any royalty to us, pursuant to Contract No. DAAA21-87-C-0123 awarded by the Department of the Army.

This application is a continuation of application Ser. No. 07/915,570, filed Jul. 20, 1992, now abandoned.

FIELD AND BACKGROUND OF THE INVENTION

The present invention relates in general to the construction of riflescopes, and in particular to a new and useful riflescope arrangement which incorporates one or more gradient index lenses.

Optical riflescopes are widely used to improve the accuracy of rifles and other small arms. A riflscope, which is a specialized telescope, includes an eye piece section which is closest to the shooter, an objective section which is furthest away from the shooter, and a relay section which is positioned between the objective and eye piece sections. The objective, relay and eye piece sections lie along the optical axis of the riflescope. A tube or housing encloses the three sections and includes mounting arrangements for fixing the riflescope to the firearm. Adjustments are provided to adjust the optical axis to intersect the barrel axis of the fire arm at a selected range. This is known as parallax adjustment. A reticle is also incorporated into the relay section and includes adjustment screws or the like which are accessible on the outer surface of the riflescope tube, for adjusting the aiming point of the rifle.

As with all telescopes, riflescopes must be designed to avoid conventional optical problems such as chromatic aberrations, focusing on distant objects, and other requirements of an optical system.

These problems are generally solved by including additional optical elements or lenses in the system to provide a sufficient number of degrees of freedom to make all adjustments. This technique is not particularly acceptable for riflescopes which must remain small and light weight in design since they must be carried along with the firearm. Additional optical elements also introduce additional problems such as alignment, complexity and increased susceptibility to damage. These are problems which should be avoided in a riflescope which will normally be subjected to greater mechanical and environmental stresses than other telescopes.

Conventional optical systems are generally assembled from a plurality of spherical optical lenses made of glass or other transparent material having a constant index of refraction throughout the material of the element.

Other types of optical elements are known however. Optical elements having aspheric surfaces are known for example which have non-spherical curvatures. This produces a different index of refraction for light as the light passes through the element at different radial positions outwardly from the optical axis of the element.

Gradient index elements are also known where the index of refraction of the material itself changes in a known manner. Radial gradient optical elements are known where the index of refraction changes in the radial direction outwardly from the optical axis of the element. Axial gradient index lenses are also known where the index of refraction changes in the axial direction along the optical axis. Examples of gradient index lenses are known to the skilled artisan in the field. See for example U.S. Pat. Nos. 3,936,149; 4,668,053; 4,674,843; and 5,029,994.

SUMMARY OF THE INVENTION

An object of the present invention is to improve riflescope designs without requiring addition optical elements. According to the invention this is done by incorporating one or more axial gradient index elements into the riflescope in place of additional elements. This provides an addition degree of freedom for each gradient index element used, without adding weight or complexity to the riflescope.

The use of axial gradient index elements also has advantages over the use of aspheric surfaces, which can also provide an additional degree of freedom without an additional element, in that the axial gradient index profile can be selected to make chromatic corrections, whereas this is not possible with aspheric surfaces.

The increased cost of gradient index surfaces over conventional elements is small compared to the advantages achieved by the present invention. The additional degree of freedom provided by the axial gradient index element also improves target definition and produces a riflescope unit which is more fieldable, light weight and reliable than riflescopes constructed entirely of spherical elements, or even riflescopes which include one or more aspherical elements.

Thus a further object of the present invention is to provide a riflescope arrangement which is simple in design, rugged in construction and still relatively economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only drawing in the application is a schematic sectional view of a stylized riflescope illustrating the present invention.

DESCRIPTION OF THE PREFERRED EMBODIMENT

Referring to the drawing in particular, the invention embodied therein comprises a riflescope generally designated 10 having an optical axis 11 surrounded by a rifle tube or housing 30 which contains and holds the various parts of the optical system forming the riflescope.

The optical system includes an eye piece section 12 which is nearest the shooter, an intermediate relay section 14 and an objective section 16 which is furthest from the shooter. All sections lie along the optical axis and include one or more optical lenses or elements which must be aligned on the optical axis. Relay section 14 also includes a reticle 18 which may be a crosshair, dot, circle, or other known reticle design, for use in sighting the riflescope for point-of-aim, Suitable screws, bolts or other arrangements are provided on the outer surface of the tube 30 (not shown) for adjusting the position of the reticle. Mounts are also provided for mounting the riflescope tube to a firearm. These also are not illustrated since they form no part of the present invention.

In the schematic illustration of the invention, objective section 16 includes a front lens or optical element 20 and a rear lens or optical element 22. Relay section 14 includes an optical element 24 and eye piece 12 includes an optical element 26.

The inventors first discovered that incorporating an aspheric surface on one of the optical elements and among the conventional spherical elements of riflescope 10, improved the system performance over identical (to the first order) all spherical models. The incorporation of a linear axial gradient instead of an aspheric element provided even greater performance and was far improved over the "homogeneous" equivalent. Many different types of axial gradients provided different kinds of observation control, especially in correcting residual chromatic aberrations.

Two particular embodiments of the invention represent substantial improvements over the conventional or homogeneous equivalent.

In one embodiment of the invention illustrated in the drawing, the front lens 20 was in the form of an axial gradient index element. In another embodiment of the invention lens 20 had an aspheric surface. A non-dispersive gradient provided an improvement in MTF plotted against cycles/mrad of 43% on the optical axis and 85% off the optical axis over the homogeneous or baseline design. The aspheric design used a conic coefficient and showed an MTF improvement of only 26% on axis and 70% off axis.

Performance could be further increased by providing different types of gradient index elements. It was found that axial gradients having a negative V-number were able to dramatically assist in canceling chromatic effects due to the opposite dispersion characteristics of the gradient compared to those of conventional (glass) lenses. Higher order axial gradients were found to reduce higher order aberrations significantly.

Placing the special surfaces elsewhere in the system did not improve performance significantly over their placement in the objective. However, when two or more gradient surfaces were used in the same system, with one remaining on the objective section 16 and the other provided either as lens 26 in the eye piece section 12 or lens 24 in the relay section 14, even further improvements could be obtained because of the increased degrees of freedom provided by the multiple axial gradient index elements.

The present invention has been found to produce a more fieldable riflescope arrangement in which resolution on axis is important for dependable shooting performance. Even resolution off axis is important since it creates a more comfortable as well a more reliable operating condition for the shooter.

While a specific embodiment of the invention has been shown and described in detail to illustrate the application of the principles of the invention, it will be understood that the invention may be embodied otherwise without departing from such principles.

What is claimed is:

1. A riflescope arrangement comprising:

a housing having an optical axis extending therealong;

an eye piece section mounted near one end of the housing and aligned with the optical axis;

an objective section mounted in the housing near an opposite end thereof spaced away from the eye piece section and aligned with the optical axis;

a relay section mounted in the housing, aligned with the optical axis and positioned between the eye piece and objective sections; and each of said eye piece, relay and objective sections including at least one optical element for refracting light propagating through the housing along the optical axis, at least one of said optical elements of said eye piece, relay and objective sections comprising an axial gradient index element.

2. An arrangement according to claim 1, wherein said objective section has at least one front optical element, said axial gradient index element forming said front optical element.

3. An arrangement according to claim 2, wherein at least one additional optical element of said objective, relay and eye piece sections comprises an axial gradient index element.

4. An arrangement according to claim 1, wherein said axial gradient index element comprises an axisl gradient index element having an index of refraction which changes long the optical axis.

5. An arrangement according to claim 3, wherein said axial gradient index element comprises an axisl gradient index element having an index of refraction which changes long the optical axis.

6. An arrangement according to claim 5, wherein said relay section inlcude a reticle and said houisng comprises a tube having open opopsite ends and containing said eye piece section, relay section and objective section.

* * * * *